United States Patent [19]

Molzahn

[11] 4,009,556
[45] Mar. 1, 1977

[54] CROP HARVESTER DRIVE AND CONTROL SYSTEM

[75] Inventor: Herbert W. Molzahn, Hamilton, Canada

[73] Assignee: International Harvester Company, Chicago, Ill.

[22] Filed: May 8, 1975

[21] Appl. No.: 575,753

[52] U.S. Cl. .............................. 56/10.7; 56/11.1; 56/11.9; 180/6.48

[51] Int. Cl.² .......................................... B62D 11/04

[58] Field of Search ................ 56/10.6, 10.7, 11.2, 56/11.9, 10.9, 14.4, 11.1, 11.4, DIG. 1; 180/6.2, 6.3, 6.48

[56] References Cited

UNITED STATES PATENTS

| | | | |
|---|---|---|---|
| 3,177,638 | 4/1965 | Johnson | 56/10.7 X |
| 3,559,385 | 2/1971 | Eaton | 56/10.7 |
| 3,613,336 | 10/1971 | Smith | 56/10.7 X |
| 3,742,685 | 7/1973 | Lian et al. | 56/11.1 |

*Primary Examiner*—J.N. Eskovitz
*Attorney, Agent, or Firm*—Neal C. Johnson; Floyd B. Harman

[57] ABSTRACT

A crop harvesting vehicle including a self-propelled chassis and a crop harvesting header coupled on the chassis. The header includes a variety of crop handling elements such as a cutter, a reel, a crop-consolidating conveyor, and conditioning rolls which cooperate in a hay windrowing operation. The chassis includes drive wheels driveable from an engine on the chassis through a hydrostatic drive system including two pumps and two motors hydraulically interconnected. The crop handling elements on the header are drivable through a third pump hydraulically connected to a motor on the header. The three pumps are mounted on the chassis with the rotary input drives thereof successively interconnected in coaxial alignment enabling the pumps to be simultaneously driven through a direct common input from the vehicle engine. The pumps for driving the vehicle and the pump for driving the crop handling elements are separately controllable and provide variable speed control and reversing of the vehicle and the header elements.

1 Claim, 5 Drawing Figures

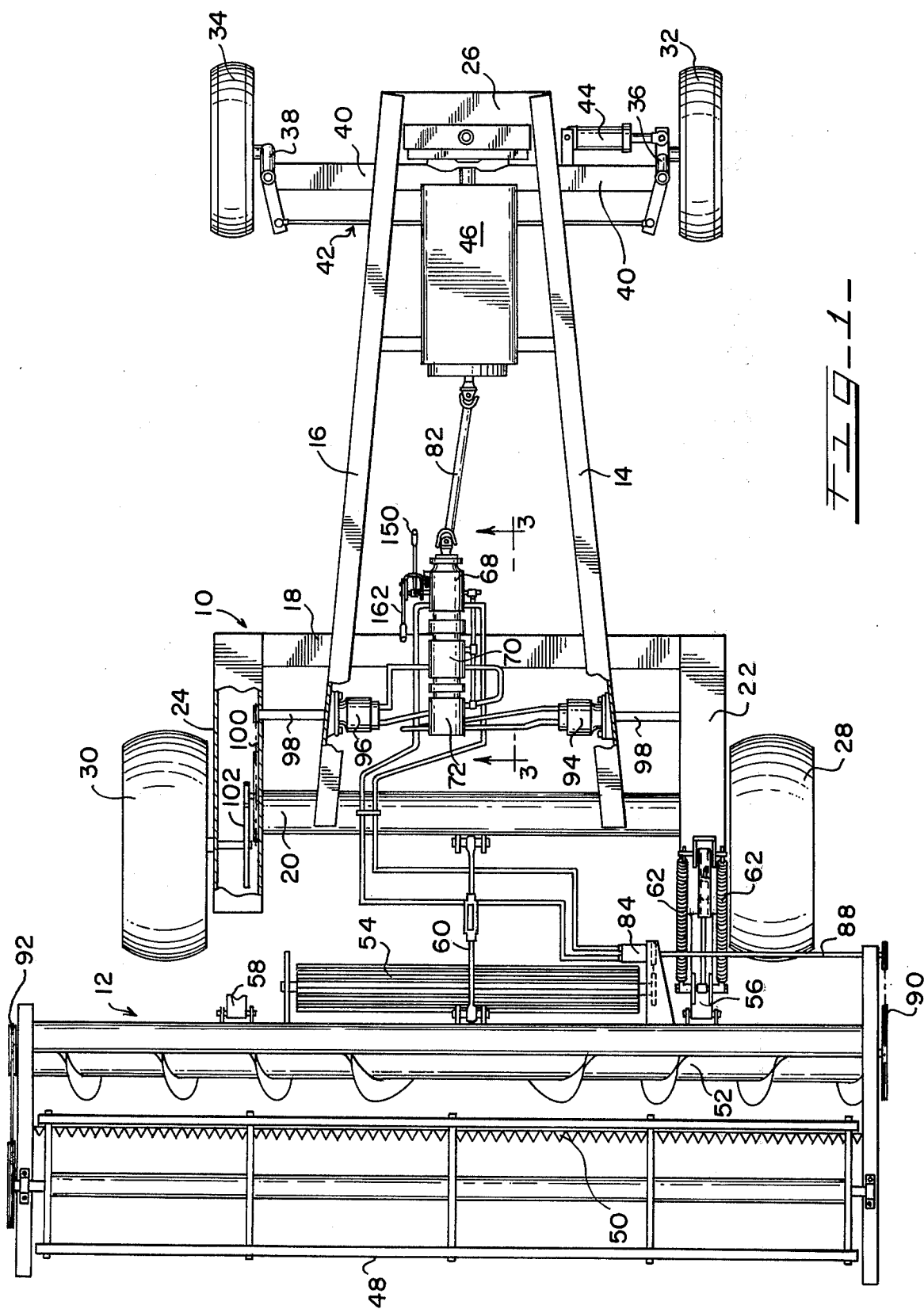

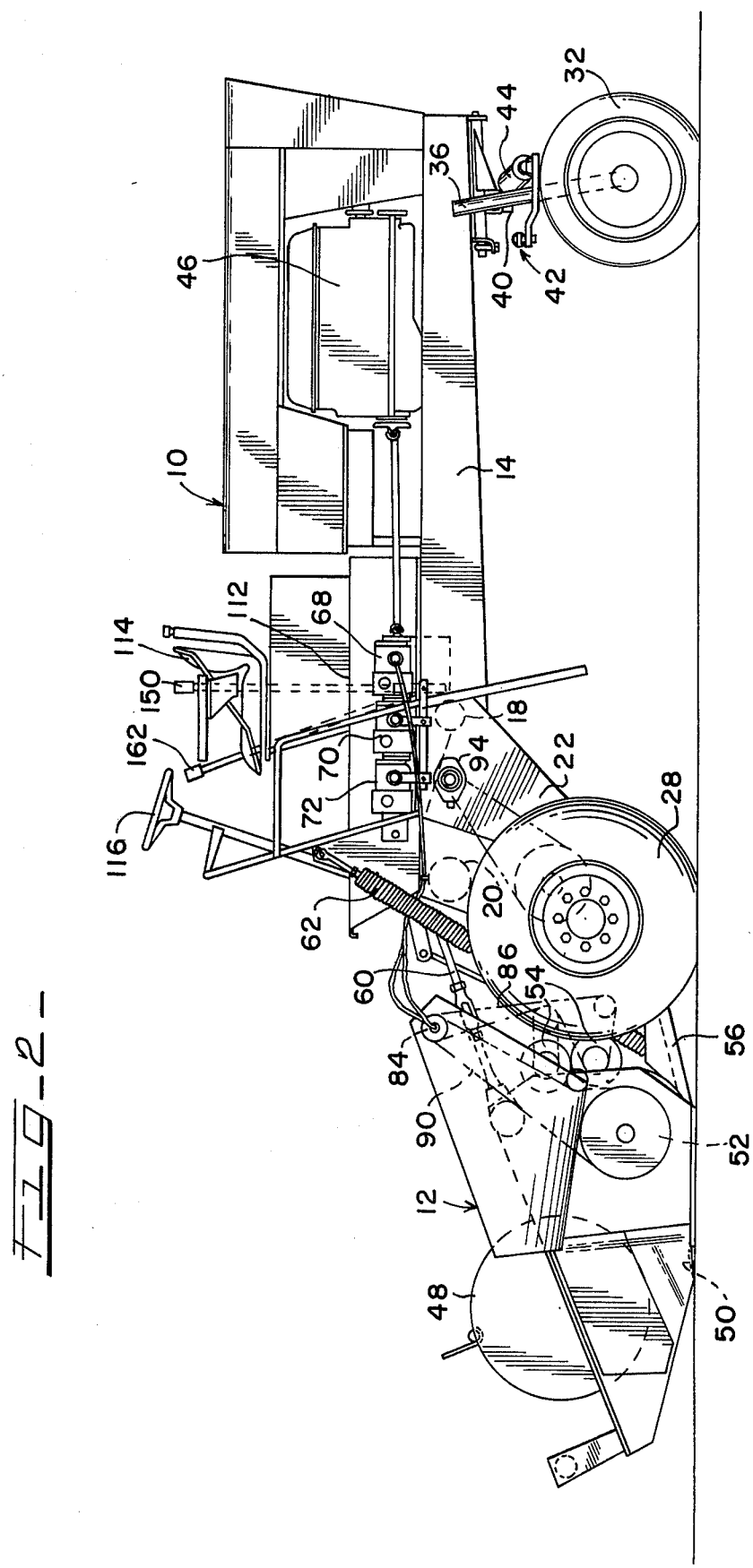

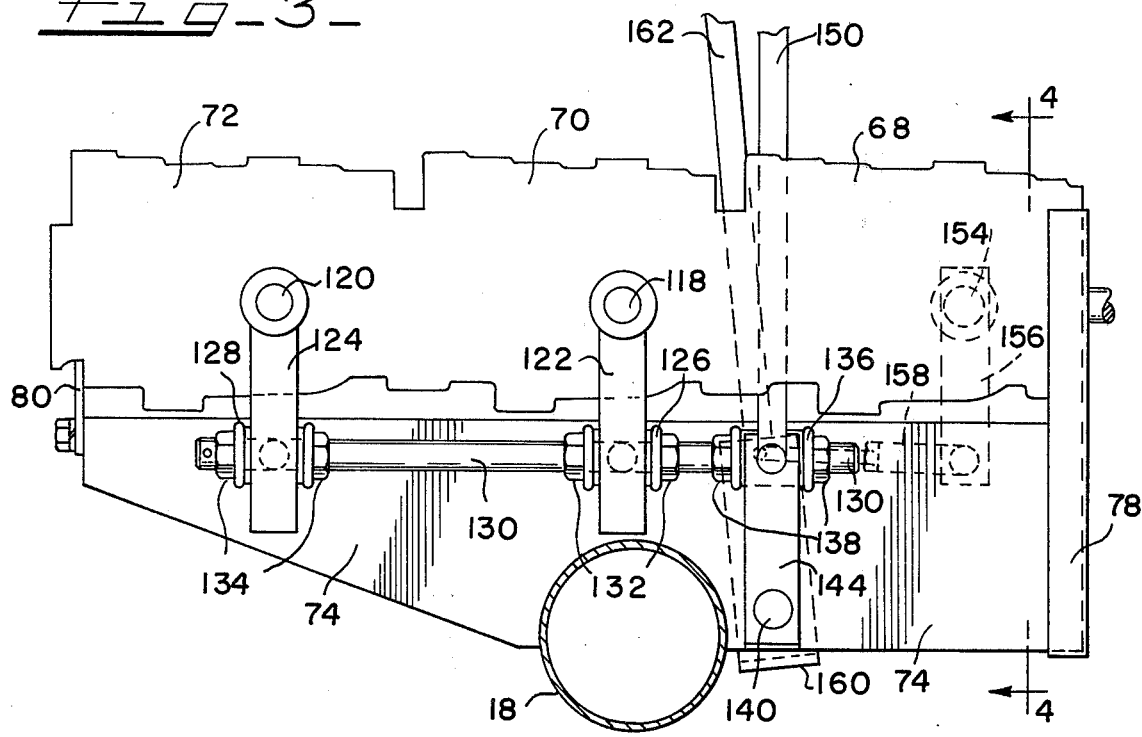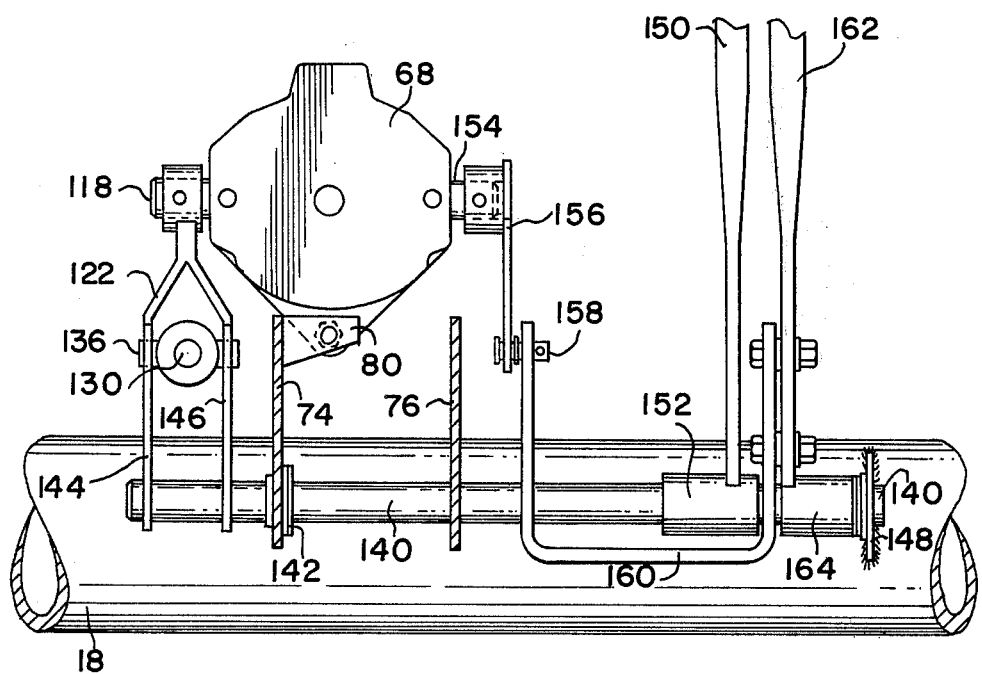

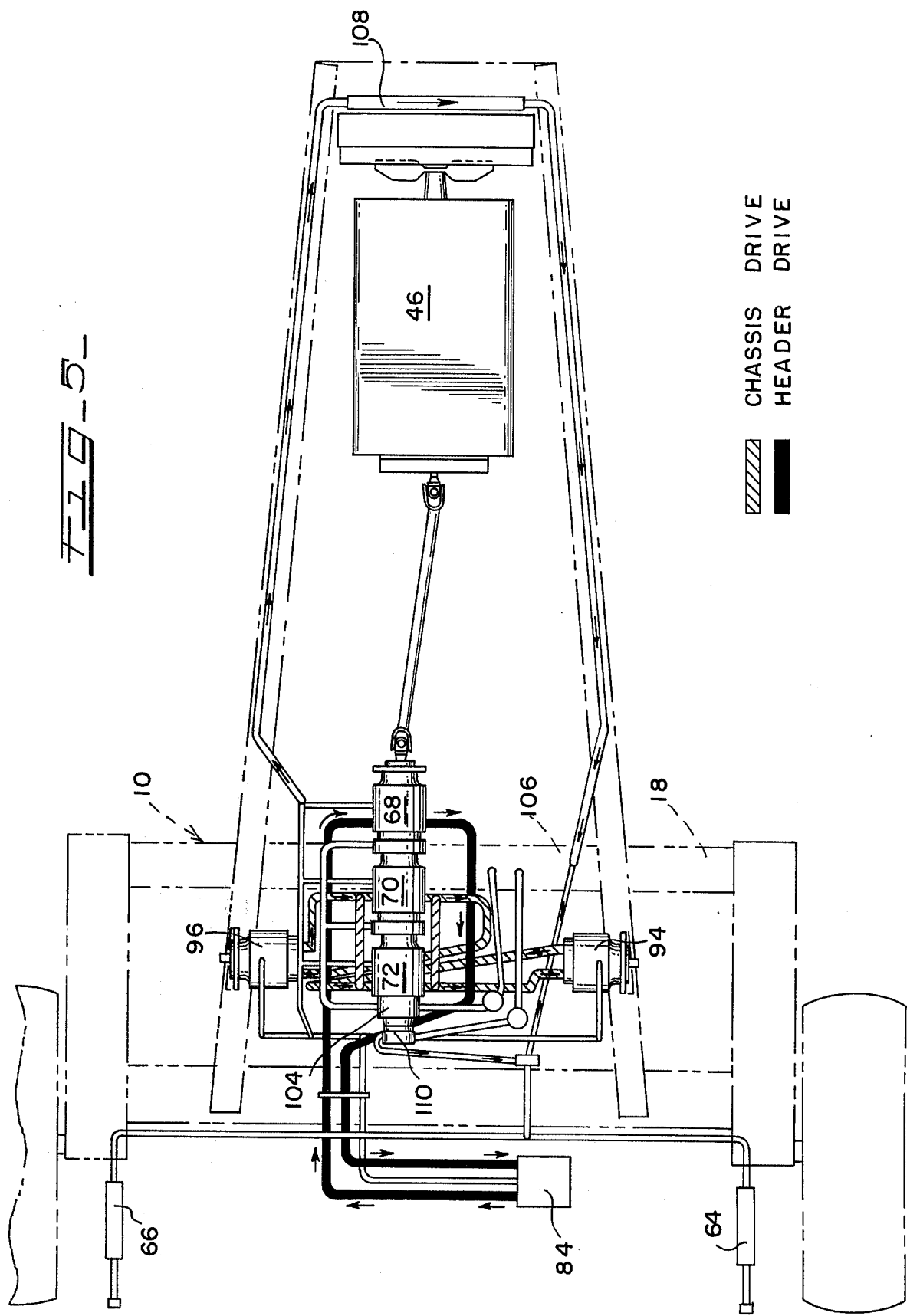

CROP HARVESTER DRIVE AND CONTROL SYSTEM

BACKGROUND OF THE INVENTION

1. Field of the Invention:

The invention relates generally to power drive systems for self-propelled crop harvesters and, more particularly, to an improved hydrostatic drive for the self-propelled chassis of the harvester and for the crop handling elements on a header coupled to the chassis.

2. Prior Art:

It is known in the art to power the crop handling components of a crop harvesting machine through hydraulic motors. Examples are shown in U.S. Pat. No. 3,613,336 and in a brochure entitled Hesston Hydro-Static Model 6600 Windrower and designated HS-1873 and published by Hesston Corporation of Hesston, Kansas. Those skilled in the art would refer to the drive of the patent as "hydraulic" whereas the drive of the machine illustrated in the brochure would be called "hydrostatic" (a specific type of hydraulic drive). By whatever art terms the power drives are referred to, the basic problem resides in designing a system for controlling a drive which provides safe and effective control of the vehicle in conjunction with considerations of manufacturing and maintenance costs.

It is believed that the prior art in this area may have evolved in the following manner: Having placed the basic pump and motor components in the vehicle chassis, the system designer then began to consider what kind of control system could be created to be compatible with the basic layout and position of the pumps and motors. Whether the design sequence is as above in every case or not, the resulting machines include a rather complex array of links, levers, arms, gears, cables and the like for controlling the power drive of the vehicle. Of course, the greater the complexity the greater the cost and probability of premature repair or replacement.

U.S. Pat. No. 3,065,700 shows a unified (and thus somewhat simplified) control for two pumps, but including an expensive governor-controlled, power-operated speed control system.

SUMMARY

The invention provides an improved drive system for a self-propelled crop harvester including simple and effective speed controls for both the vehicle chassis and the crop harvesting components. The invention includes a unique interrelationship of a pair of pumps for the chassis drive and a pump for the header drive wherein these three pumps are mounted coaxially so as to be directly driven from a common input and controllable through extraordinarily simple mechanisms accessible to the operator. Conceptually the invention is related to placement of the pumps relative to each other to thus simplify the means for driving and controlling the pumps.

It is an object of the invention to provide an improved hydrostatic drive system for the chassis and the crop handling components of a self-propelled harvester.

A further object is to provide such a system which is driven and controlled through simplified structure resulting in reliable operation and less costly maintenance.

A still further object is to provide such a system including a hydrostatic drive for crop handling components, such drive having the capability of quick responsive speed changes including reverse drive to assist in unclogging the crop in the header if necessary.

BRIEF DESCRIPTION OF THE DRAWINGS

FIG. 1 is a plan view of a self-propelled windrower including the hydrostatic drive system of the invention;

FIG. 2 is a side elevation view of the windrower of FIG. 1;

FIG. 3 is an enlarged fragmentary sectional view in elevation of the pumps of the drive system and portions of the control structure therefore taken along lines 3—3 of FIG. 1.

FIG. 4 is an enlarged fragmentary sectional view in elevation taken along line 4—4 of FIG. 3; and, FIG. 5 is a schematic view of the hydrostatic drive systems for the windrower chassis and header.

DESCRIPTIONS OF THE PREFERRED EMBODIMENT

Referring first to FIGS. 1 and 2 there is shown a windrower having a self-propelling chassis 10 and a crop windrowing header 12 coupled to the forward end of the chassis 10. The chassis 10 includes a pair of longitudinal frame members 14 and 16 of channel section. A pair of tubular cross frame members 18 and 20 is welded to the frame members 14 and 16 and project transversely therebeyond as shown. A pair of final drive housings 22 and 24 is secured to the respective opposite ends of the cross frame members 18 and 20 and project downwardly and somewhat forwardly therefrom as shown in FIG. 2 with reference to the housing 22. A cross frame member 26 is secured between the rearmost ends of the frame members 14 and 16.

The forward end of the chassis 10 is supported on drive wheels 28 and 30 journalled outwardly of the housings 22 and 24 respectively. The rear of the chassis 10 is supported on a pair of wheels 32 and 34 steerably mounted in sleeves 34 and 36 secured to the respective opposite ends of a walking beam 40. The beam 40 is pivotally connected to suitable cross bracing, including the frame member 26, beneath the chassis frame work for pivotal movement about the longitudinal center line of the windrower. The steerable wheels 32 and 34 are maintained in parallel relation by a tie rod linkage shown generally at 42 in FIG. 1. The direction of the wheels is determined by a double acting hydraulic piston-cylinder unit 44 connected between the beam 40 and the wheel 32.

The windrower is powered from an engine 46 mounted toward the rear of the chassis 10. As will be described the engine provides mechanical power for hydrostatic drive systems for the chassis 10 and the header 12.

The header 12 may be constructed in accordance with known principles and includes crop handling elements such as a reel 48, a cutter 50, a crop-consolidating auger conveyor 52, and hay conditioner rolls 54. These elements are cooperatively power driven through mechanisms known in the art for cutting the standing crop, consolidating the crop centrally of the header, conditioning the crop, and discharging it onto the ground in a windrow for curing. The header 12 is coupled to the chassis 10 by a pair of lower links 56 and 58 and an upper link 60. Suitable coil springs such as shown at 62 (in conjunction with the lower link 56) are operative to provide header floatation in accordance with known principles. As shown schematically in FIG. 5 a pair of hydraulic piston cylinder units 64 and 66 is operative between the chassis and the header for selective powered raising of the header.

In accordance with the invention the hydrostatic drives for the chassis 10 and the header 12 include three basically similar pumps 68, 70, and 72 successively interconnected in coaxial relation so as to be drivable directly by a common input and controllable through a simple mechanical system. In practice, the pumps 68, 70, and 72 are of the rotary driven, variable displacement, axial piston type well known in the art, each having a so-called swash plate which is movable to vary the pump displacement. As best shown in FIGS. 3 and 4, the pumps 68, 70, and 72 are supported on the tubular cross frame member 18 on a box-like framework including a pair of vertical plates 74 and 76 and end plates 78 and 80. Mechanical drive to the aligned pumps is transferred from the engine 46 through suitable shafting 82 providing a common input for the aligned pumps.

The rearmost pump 68 is connected hydraulically (in the generic sense) to a motor 84 on the header in a closed loop in what is referred to more specifically as a hydrostatic drive. The motor 84 is of the rotary driven, fixed displacement, axial piston type known in the art. As shown schematically in FIGS. 1 and 2, the motor 84 drives the conditioner rolls 54 through a chain and sprocket drive 86. The auger conveyor 52 is driven through a drive shaft 88 and a chain and sprocket drive 90. The reel 48 is driven from the opposite end of the auger conveyor 52 through a combined belt and chain drive 92. The cutter 50 is driven from the drive shaft 88 through a belt drive (not shown). The system for controlling the header hydrostatic drive system will be subsequently described.

The pumps 70 and 72 are hydraulically connected to a pair of motors 94 and 96 bolted to the frame channel members 14 and 16 respectively for providing power drive to the wheels 28 and 30. The motors 94 and 96 are of the rotary driven, fixed displacement, axial piston type known in the art. The rotary drive of each of the motors 94 and 96 is transferred mechanically to the respective drive wheels 28 and 30 by conventional means including an output shaft 98, a chain and sprocket drive 100, and a gear drive 102 —the drives 100 and 102 being disposed within the respective housings 22 and 24.

The circuitry for the hydrostatic header and chassis drive is shown diagrammatically in FIG. 5 wherein the basic header drive circuitry is shown in solid lines and the chassis drive circuitry is shown in cross hatched lines. In the particular embodiment shown it will be noted that the outputs of the pumps 70 and 72 are joined so as to be available to both of the motors 94 and 96. The pumps 68, 70, and 72 are kept supplied with hydraulic fluid by a charge pump 104 mounted at the front of the pump 72 and driven mechanically thereby. The charge pump 104 draws the fluid from a reservoir 106 defined within a portion of the interior of the tubular cross-frame member 18. Internal fluid leakage from the pumps and the motors is moved through a cooler 108 (through which air is moved by the engine fan) before being returned to the reservoir. Hydraulic pressure fluid is made available to the header lift cylinders 64 and 66 from a pump 110 mounted at the front of the charge pump 104 and driven mechanically thereby.

As shown generally in FIG. 2 the windrower includes an operator's station having a deck 112 disposed above the chassis framework and upon which a seat 114 is mounted. A steering wheel 116 projects upwardly accessible to the operator for controlling the flow of hydraulic fluid to the steering unit 44 (FIG. 1) to control the direction of movement of the windrower. The hydraulic circuitry (not shown) for the rear wheel steering system is conventional and as such includes a small pump actuated directly by the steering wheel 116 for opening a shuttle valve permitting output from the pump 110 to flow to the steering unit 44.

In accordance with the invention means are provided, accessible to the operator, for controlling the forward and reverse speed of the windrower vehicle and the crop handling elements of the header 12. The controls for the vehicle speed will be described first. As best shown in FIGS. 3 and 4 the pumps 70 and 72 include respective stub shafts 118 and 120 extending laterally therefrom. It will be understood that these shafts control the angle of the internal swash plates of the pumps to vary the pump displacements and thus vary the speeds of the drive motors 94 and 96. Bifurcated control arms 122 and 124 are secured to the respective stub shafts 118 and 120 and extend downwardly therefrom. Trunnions 126 and 128 are pivotally connected to the lower ends of the control arms 122 and 124 respectively in longitudinal alignment.

An elongated control rod 130 extends through the aligned trunnions 126 and 128 and is secured thereto by respective pairs of lock nuts 132 and 134. It will be seen that forward and rearward movement of the control rod 130 will swing the control arms 122 and 124 in unison to thus vary the outputs of the pumps 70 and 72 from full reverse to full forward. The control rod 130 extends rearwardly from its connection to the control arm 122 so as to receive a trunnion 136 thereon and secured thereto by a pair of lock nuts 138.

As best shown in FIG. 4 a rock-shaft 140 is journalled in a bearing 142 mounted in the plate 74. A pair of strap members 144 and 146 is secured to the rock-shaft 140 and extend upwardly to pivotally engage opposite sides of the trunnion 136. The rockshaft 140 extends through the plate 76 and is journalled at its end in a flange 148 welded to the cross frame member 18. A speed control lever 150 is welded to a sleeve 152 which is pinned to the rock-shaft 140. As shown in FIG. 1 the speed control lever 150 extends upwardly through the operator's deck 112 so as to be readily accessible for fore-and-aft movement. It will be understood that suitable means (not shown) are included for frictional retaining the lever 150 in any drive position selected by the operator.

The control for the header drive pump 68 is shown in FIGS. 3 and 4. A stub shaft 154 projects from the pump 68. A control arm 156 is secured to the shaft 154 and extends downwardly therefrom. A length-adjustable link 158 is pivotally connected to the lower end of the arm 156 and extends forwardly therefrom. As best shown in FIG. 4 a U-shaped strap 160 is journalled on the rock-shaft 140. One leg of the strap 160 is pivotally connected to the forward end of the link 158. The other leg of the strap 160 is bolted to a control lever 162 which is welded to a sleeve 164 journalled on the rock-shaft 140. As shown in FIG. 1 the control lever 162 extends upwardly through the deck 112 so as to be accessible for fore-and-aft pivotal movement.

The operation of the vehicle speed control system is the essence of simplicity. The vehicle speed is controlled by moving the lever 150 to shift the control rod 130 which swings both control arms 122 and 124 in unison. The hydraulic outputs of the pumps to the drive motors are thus changed in unison and the speed of the vehicle is changed. The speed control lever 150 is movable forwardly and rearwardly from a given neutral position wherein the swash plates of the pumps are set so that no pump output is produced. As the lever 150 is moved forwardly from the neutral position the outputs of both pumps will be increased and thus the vehicle speed will increase. Pulling the lever 150 rearwardly from the given neutral position will reverse the pump outputs and thus reverse the drive motors.

The hydrostatic header drive permits the operator to exercise variable speed control of the crop handling elements so as to optimize the efficiency of the header. For example, in delicate crops such as green peas, the output of the pump 68 to the header drive motor 84 can be slowed so that the crop is smoothly and gently moved through the harvesting sequence. In the event that clogging of the crop should occur the elements can be quickly and easily driven in reverse to assist in unclogging the crop.

By the foregoing applicant has provided a drive and control system having practical utility in accomplishing the objects of the invention.

What is claimed is:

1. In a crop harvester including a self-propelled chassis, an engine, two drive wheels, a crop harvesting header coupled to the chassis including crop handling elements, a power drive system for the harvester comprising:

first and second hydraulic motors for driving said drive wheels;
a third hydraulic motor for driving said crop handling elements;
first and second hydraulic pumps of variable displacement hydraulically connected to said first and second motors for supplying pressure fluid thereto;
a third hydraulic pump of variable displacement hydraulically connected to said third motor for supplying pressure fluid thereto, said first, first, second, and third pumps having rotary input drives;
means mounting said first, second, and third pumps on said chassis with the input drives thereof successively interconnected in coaxial alignment so that the pumps may be simultaneously driven through a common input;
means drivingly connecting said engine to said common input;
and control means for varying the displacement of said first and second pumps to vary the speed of said first and second motors, whereby the speed of the crop harvester chassis may be controlled;
said control means including a control rod disposed parallel to the aligned input drives;
means pivotally interconnecting said control rod to said first and second pumps for simultaneously varying the outputs thereof in response to longitudinal shifting of said rod;
a rock-shaft journalled on said chassis and disposed transversely relative to said control rod;
means interconnecting said rock-shaft to said control rod for shifting said control rod in response to rotation of said rock-shaft;
and a control lever secured to said rock-shaft for shifting said control rod to vary the displacements of said first and second pumps.

* * * * *